United States Patent [19]
Belli

[11] 3,772,700
[45] Nov. 13, 1973

[54] MICRO-WAVE TEST SET AN/SPG-51B RADAR

[76] Inventor: William F. Belli, 3503 Shelton Rd., Portsmouth, Va. 23703

[22] Filed: Jan. 27, 1970

[21] Appl. No.: 10,107

[52] U.S. Cl. .............................. 343/17.7, 343/703
[51] Int. Cl. ............................................. G01s 7/40
[58] Field of Search ........................... 343/17.7, 703

[56] References Cited
UNITED STATES PATENTS

| | | | |
|---|---|---|---|
| 3,153,760 | 10/1964 | Henderson | 343/17.7 X |
| 3,225,295 | 12/1965 | Altman et al. | 343/17.7 X |
| 3,357,017 | 12/1967 | Jewell | 343/17.7 |
| 3,363,249 | 1/1968 | Hershey et al. | 343/17.7 |

Primary Examiner—T. H. Tubbesing
Attorney—Edgar J. Brower, Thomas O. Watson, Jr. and Robert R. Anderson

[57] ABSTRACT

A microwave test set for checking the operation of a waveguide and its components while the waveguide is still mounted on equipment. A signal of known power level from a variable signal source is injected at the front end of the antenna system and by the use of an assembly of three C band hybrid T assemblies power of equal amplitude, and in the proper phase, is simultaneously inserted in each quadrant of a four quadrant cluster. This input power is then compared with power measured at the end of the waveguide run to determine the amount of attenuation present.

6 Claims, 7 Drawing Figures

INVENTOR
WILLIAM F. BELLI

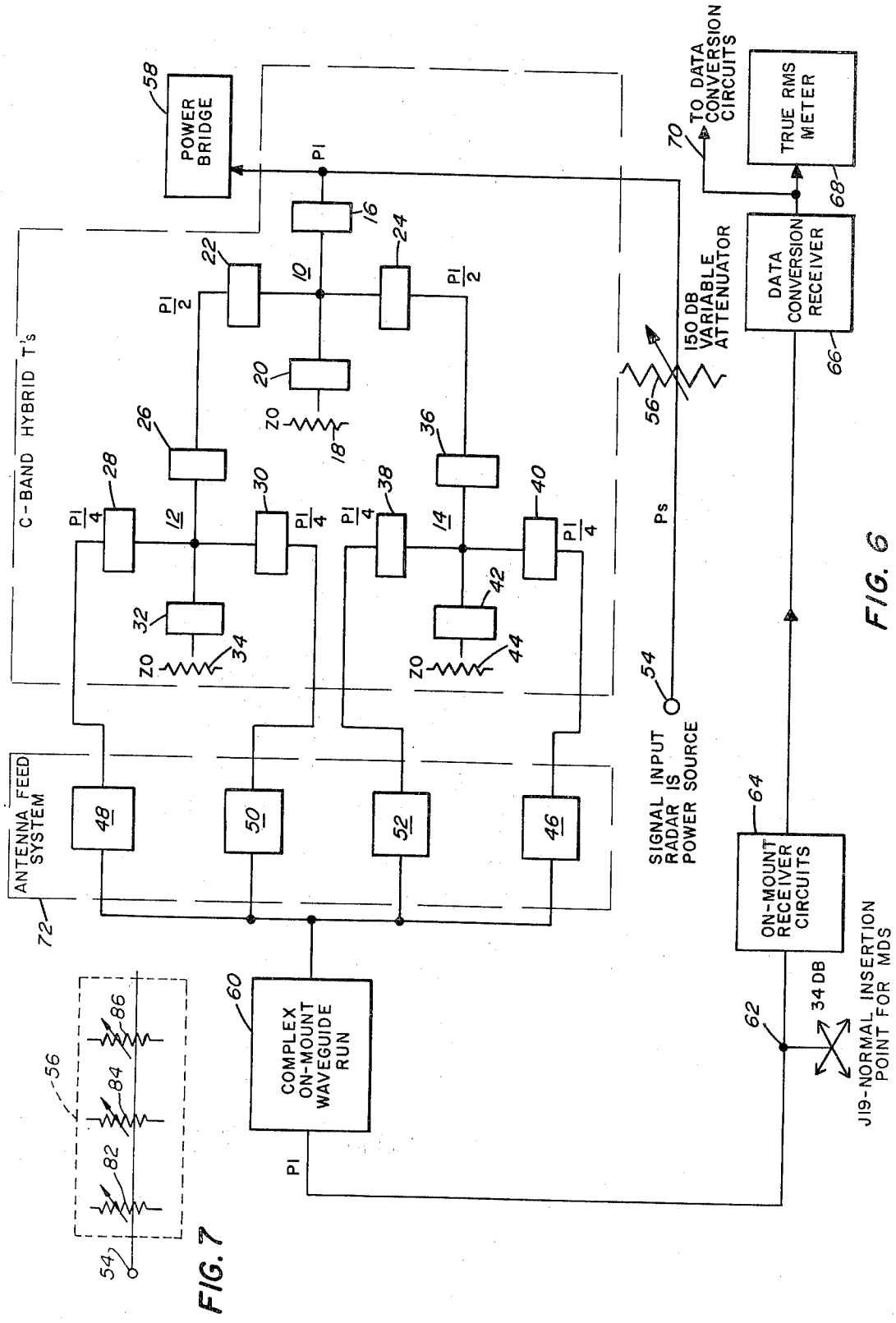

MICRO-WAVE TEST SET AN/SPG-51B RADAR

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The present invention relates to test equipment and more particularly to test equipment in the form of a microwave test set which is used to check the operation of a waveguide for the AN/SPG-51B radar.

It has been the experience in the past of electronic repair personnel that the lack of proper testing devices makes it very difficult and costly to properly evaluate the operating condition of the complex on mount waveguide run of the AN/SPG-51B radar. The only method that has been available to the engineer in the past is to physically disassemble and visually inspect the waveguide components to determine degradation. This, to say the least, is time consuming and requires the assistance of shipyard personnel. This also puts the ship out of operation for a considerable length of time, approximately 1 week. Furthermore, this prior art system requires collimation of the antenna systems after reassembly and the possibility of destroying null fill characteristics if improper handling of components occurs. There have been several instances in the past where salt water has been introduced into the complex waveguide system due to the rupture of one of the numerous components in this waveguide run. The engineer on the job very correctly has the obvious section replaced, but has no means to determine if a appreciable degrading of other parts of the waveguide run has occurred due to this introduction of salt water into the system, unless he has the ship put on a repair status and has all of the hardware disassembled for inspection. Obviously, an operational ship must have justification for this action. As the situation is at the present, the engineer might just as well "flip a coin" to make this recommendation, due to lack of data and/or the means to obtain it.

SUMMARY OF THE INVENTION

IN view of the above listed disadvantages and shortcomings of the prior systems the test set of the present invention has been constructed to evaluate the condition of this waveguide run in terms of electrical loss. The system provides a tester which is easy to use, one which is readily applied to a radar without having to dismantle the radar system, and one which provides extreme accuracy in its readings. Through the use of this tester deterioration and weak spots in the waveguide run can easily be detected even though in most cases this deterioration is not obvious to the engineer making the test and is discovered only through the process of taking accurate electrical measurements.

OBJECTS OF THE INVENTION

An object of the present invention is the provision of a waveguide test set for testing the operation of complex waveguide runs.

Another object of the invention is the provision of a test set to establish and record the actual electrical loss in complex waveguide systems.

Another object of the present invention is the provision of a means to isolate a section of waveguide or a microwave component that is contributing excessive loss in the waveguide system.

Still another object is the provision of a waveguide test set which may be used without having to dismantle the equipment.

Still another object is the provision of a waveguide test set which does not require collimation of the antenna and avoids improper handling of component parts.

Other objects, advantages and novel features of the invention will become apparent from the following detailed description of the invention when considered in conjunction with the accompanying drawings.

BRIEF DESCRIPTION OF THE DRAWINGS

FIG. 6 shows an overall schematic of the tester.

FIG. 7 shows an alternate embodiment of the attenuator 56 of FIG. 6.

DESCRIPTION OF THE PREFERRED EMBODIMENTS

Figure 1:
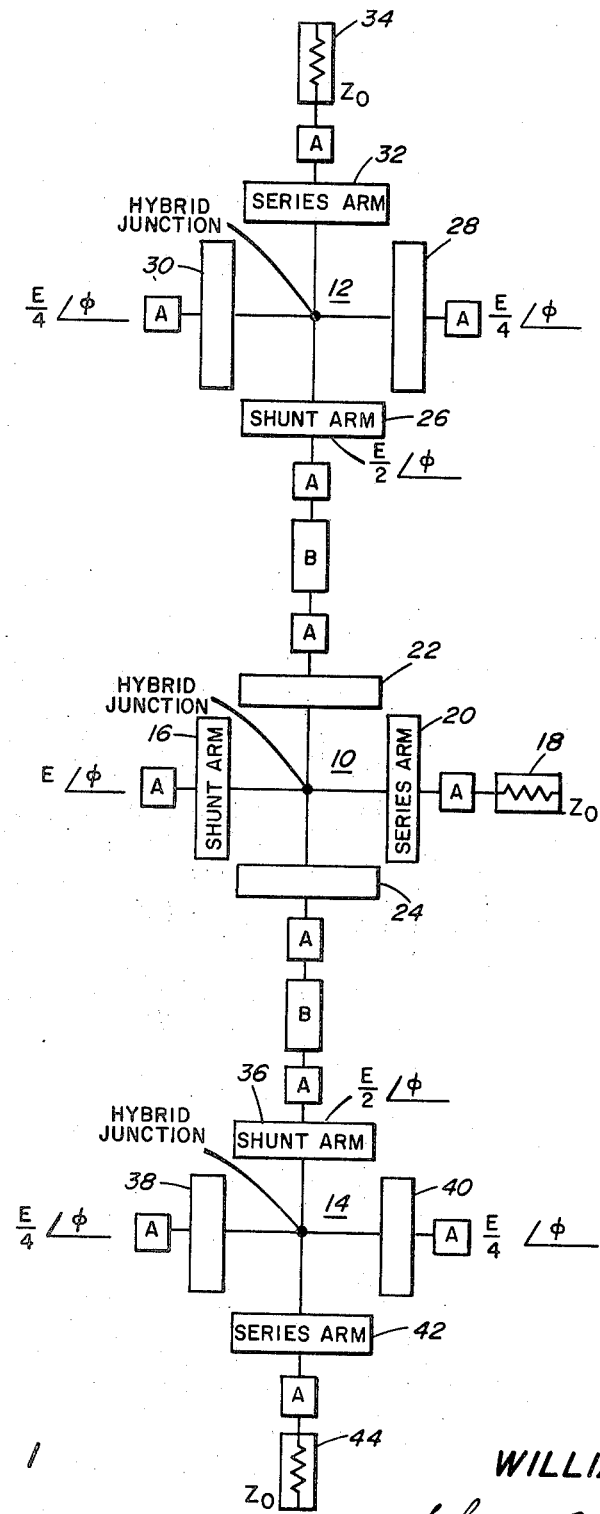
FIG. 1 shows a diagram of the manner in which the hybrid junctions are connected.
Figure 3:
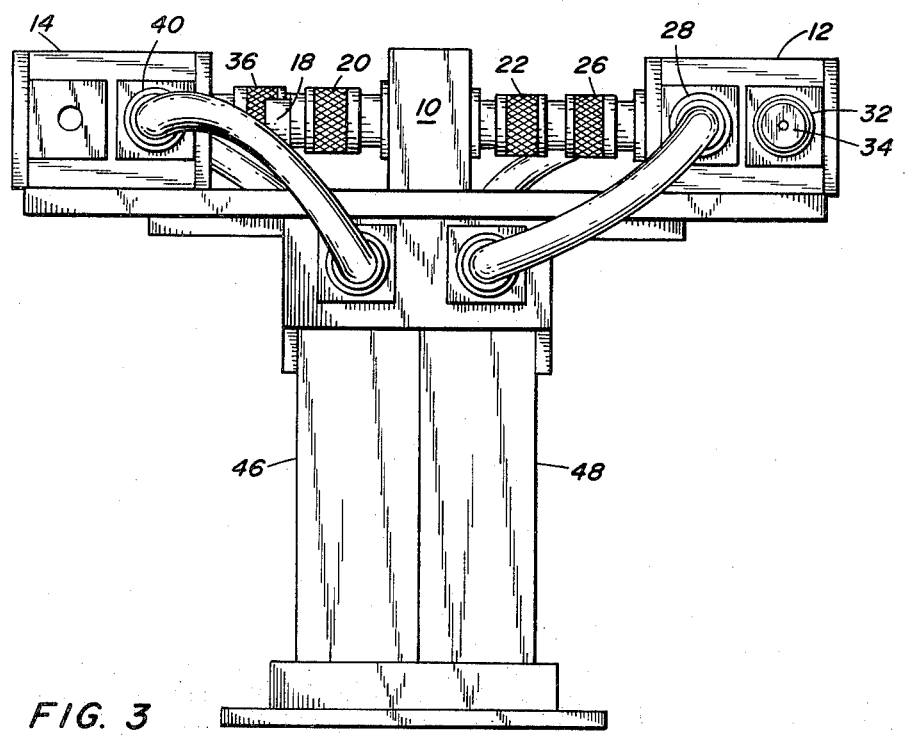
FIG. 3 shows a side elevation of the tester.
Figure 2:
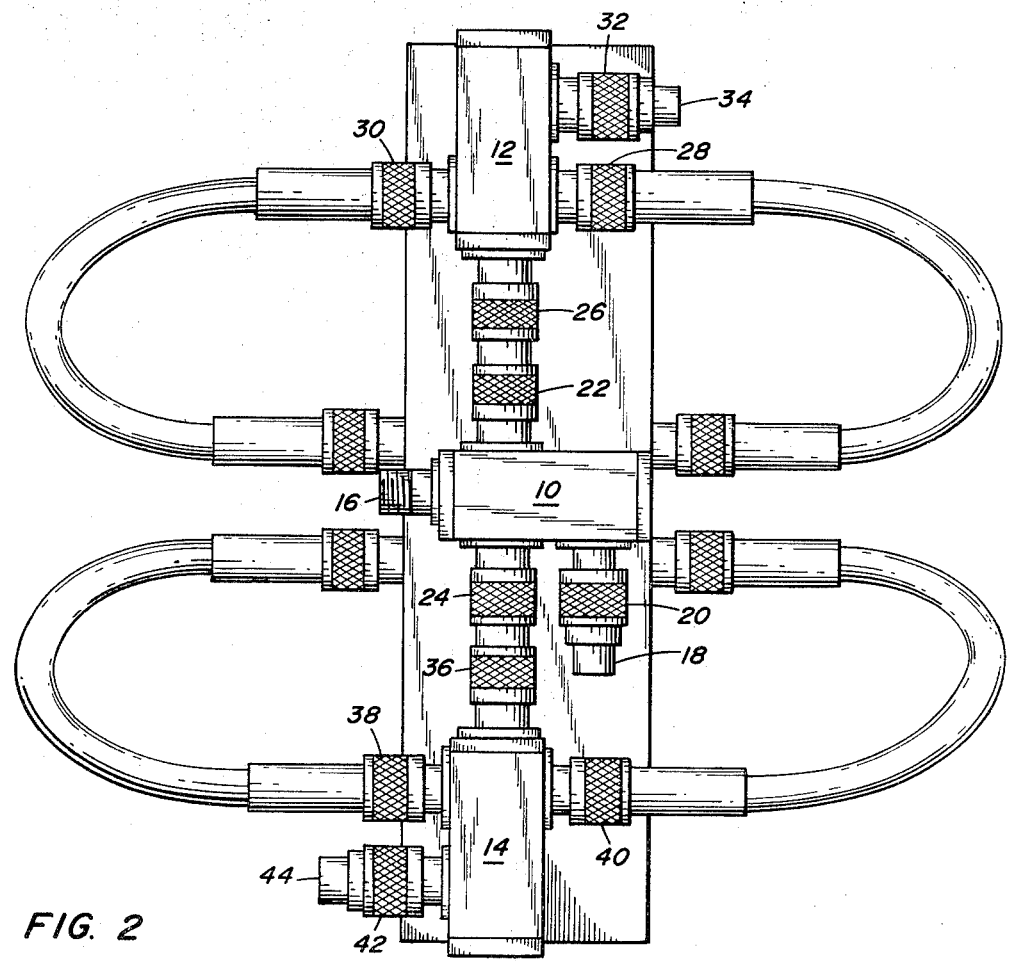
FIG. 2 shows a plan view of the tester.
Figure 4:
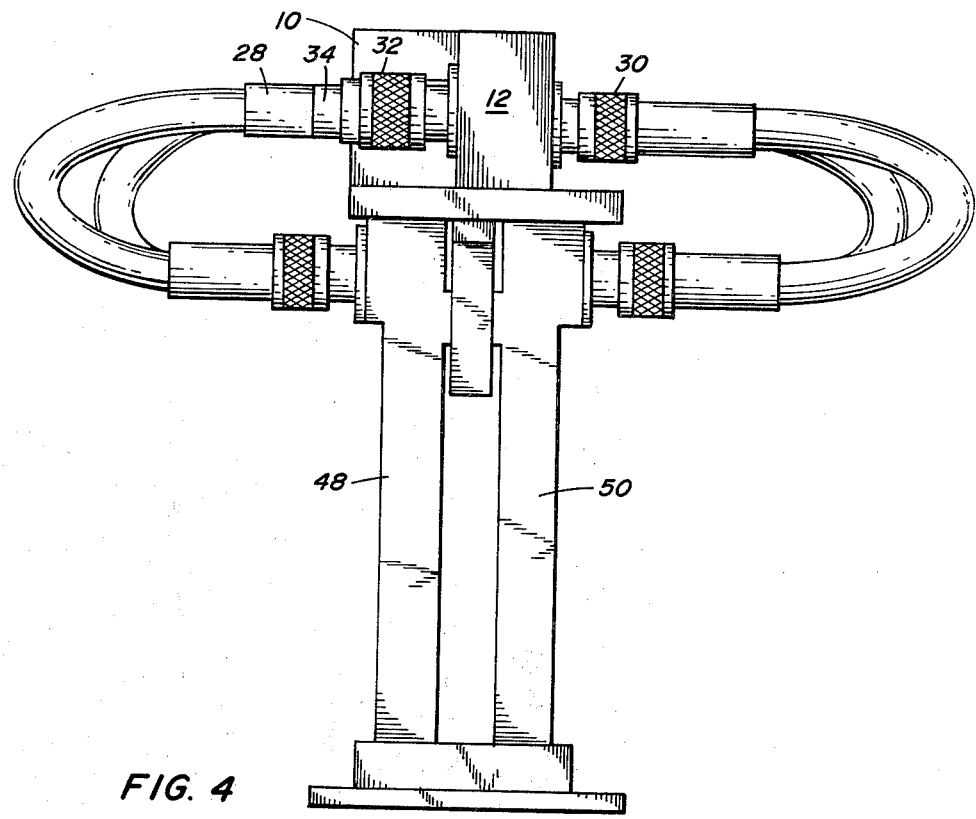
FIG. 4 shows an end elevation of the tester.
Figure 5:
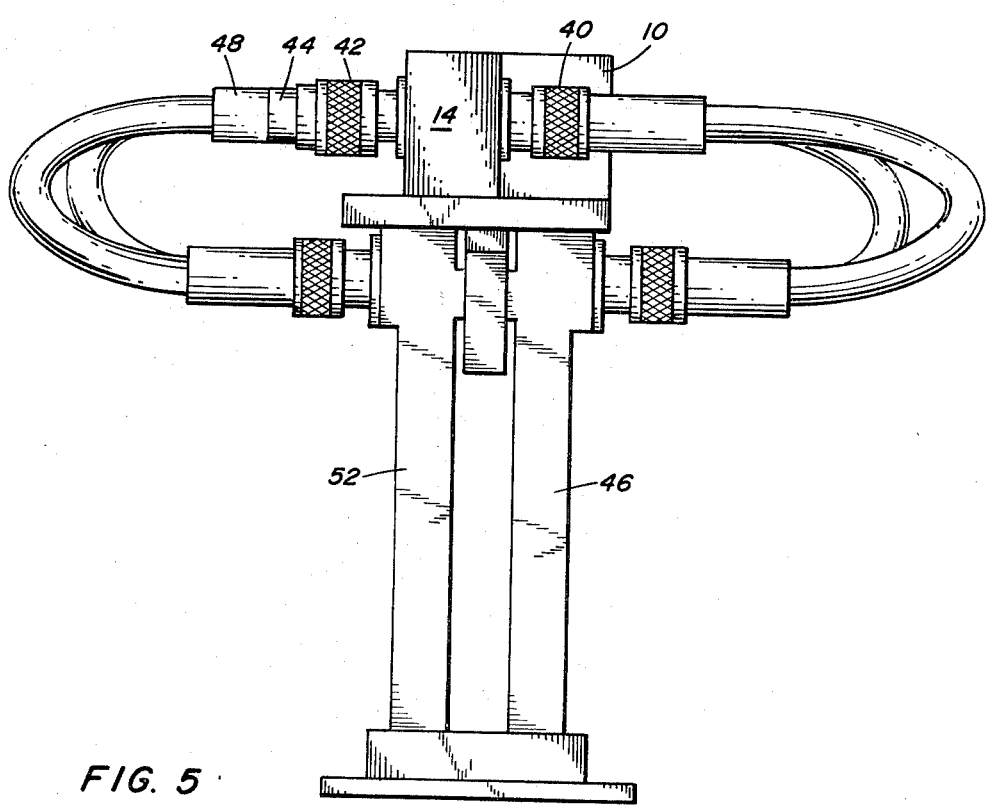
FIG. 5 shows another end elevation of the tester.

Referring now to FIG. 1 of the drawings there is shown a diagram of the manner in which the three C band hybrid T assemblies are connected. It will be noted that each of the assemblies has four arms or terminals, such as a shunt arm, a series arm, and two phase shifted arms. Looking at FIG. 1 it will be seen that an electromagnetic signal is applied to shunt arm 16 of the center hybrid junction 10. The series arm 20 of this junction is connected to a dummy load 18 which has a value equal to the characteristic impedance of the arm. The two phase shift arms 24 and 22 produce signals which have been phase shifted and have an electrical value of one-half of the input signal. The output of arm 22 is then connected to shunt arm 26 of hybrid junction 12, this junction producing outputs on arms 30 and 28, respectively, which have again been cut in half so that its output is one-fourth of the applied electrical potential. The series arm of junction 12 is also connected to a dummy load 34 which is equal in value to the characteristic impedance of the arm.

The other output signal from the hybrid junction 10 as appearing on arm 24 is applied as an input to shunt arm 36 of hybrid junction 14, the series arm of this junction 42 being connected to a dummy load 44 also equal to the characteristic impedance of the arm. Hybrid junction 14 also produces two outputs on its arms 38 and 40, respectively, which like the output from hybrid junction 12 is also equal to one-fourth of the input potential.

FIGS. 2, 3, 4 and 5 show various elevation views of the hybrid junction assembly, with corresponding parts having the same identifying numeral in the various figures. From FIGS. 1 - 5 inclusive it can now be seen that the hybrid junction assembly produces four outputs of like amount as from arms 28, 30, 38, and 40, and these outputs are applied to four waveguides, 46, 48, 50 and 52. These waveguides of course, are those belonging to the four quadrant cluster of the antenna feeding system of the radar under test.

In FIG. 6 there is shown a complete test equipment set up including the C band hybrid T arrangement previously described and shown in this figure within the dotted lines. Input terminal 54 is used to apply the signal input which is obtained from the STAMO of the radar under test. Connected to the input terminal 54 there is a 150 db variable attenuator 56 for adjusting the power of the input signal before it is applied to hybrid junction 16. Also connected to the input of hybrid T junction 16 there is a power bridge 58, the function which will be described more fully hereinafter. The structure of the hybrid T assembly and component parts are the same as those described for FIG. 1, the output of this assembly being connected to an antenna feed system shown generally as 72. The antenna feed system 72 consists of four similar waveguide sections 48, 50, 52, and 46 their outputs all being connected in parallel and connected to an on mount waveguide run 60. The output of waveguide run 60 in turn passes through a test point 62 before the signal is applied to the receiver circuits 64, the signal then being passed on to a data convertor receiver 66 where the output is divided between a data convertor circuit 70 and a true RMS meter 68.

In FIG. 7 there is shown an alternative embodiment of the attenuator 56 of FIG. 6. Instead of the 150 db variable attenuator shown in FIG. 6, three 50 db variable attenuators 82, 84 and 86 connected in series may be used.

Turning now to the structure and theory of operation of the invention it will be recalled that the intregrated hybrid T assembly consists of three each hybrid T's, 10, 12 and 14, three each dummy loads 18, 34, and 44 to terminate series arms 20, 32, and 42 into their characteristic impedance and two each N type feed through connectors. The antenna feed system 72 (FIG. 6) is a modified feed horn having its window portion cut from the assembly. A shorting plate was installed across the four sections of open waveguide 48, 60, 52 and 46 and each section of the waveguide was machined to accommodate the dipole and N type connector from a waveguide to coaxial adaptor. The intregrated hybrid T assembly was then mounted and electrically connected to the modified feed horn.

Preparation for test requires removal of the normal feed horn assembly, and replacement with the modified feed horn of the test set. The radar receiver should be checked to insure proper crystal currents and proper AGC set at data convertor receiver 66. Zero knot clutter is selected and break track is depressed and maintained depressed throughout the entire test. A true RMS meter 68, or equivalent, is connected to the data convertor receiver 66 output. The remaining test equipment should be connected as shown in FIG. 6.

Procedure for making the test is as follows:
Step 1: The waveguide switch is temporarily closed at this time to eliminate possibilities of destroying mixer crystals by the application of too high a power level.
Step 2: The variable attenuators 56 are now adjusted to yield a zero db reading on power bridge 58. The sum of the three attenuator settings are now recorded as reading A, test 1 on a work sheet. After reading A is obtained the attenuators should be set to 50 db each and waveguide switch opened.
Step 3: While observing the true RMS meter 68 adjust the variable attenuators 56 until the output of data convertor receiver 66 yields 100 mv on the true RMS meter. The sum of the three attenuators is now recorded as reading B, test 1 on the work sheet. (This step should be repeated four times, each time using different combinations of attenuator settings and the average reading taken.) The relative MDS for test 1 is now computed as reading B − reading A + 1 and recorded on the worksheet. The +1 db is to account for insertion loss of the modified feed horn 72. Reference level of 100 mv was selected to insure that the linear portion of the radar receiver gain curve is being used.
Step 4: The output of the variable attenuators and the power bridge is now connected to the 34 db test point 62.
Step 5: The variable attenuators are now adjusted until the power bridge indicates 0 db. The sum of the three attenuator settings is now recorded as reading A, test 2 on a worksheet.
Step 6: Again the variable attenuators are adjusted to yield a 100 mv output of data convertor receiver 66 as read on true RMS meter 68. The sum of the three attenuators settings is recorded as reading B, test 2 on the worksheet. (This test should be repeated 4 times, each time using different combinations of the attenuator settings and the average reading taken.) The relative MDS for test 2 is now computed as reading B − reading A + 34. The +34 is compensation for 34 db insertion loss at point 62.
Step 7: A complex waveguide loss is now computed as relative MDS 1 − relative MDS 2 and recorded on the worksheet.

From the above description of the structure and operation of the invention it can be seen that the disclosed microwave test set provides an accurate, inexpensive, and rapid means of evaluating a complex waveguide system in terms of electrical loss and that the data obtained by the test set can be very useful in the early detection of waveguide deterioration so that remedial action can be promptly taken.

Obviously many modifications and variations of the present invention are possible in the light of the above teachings.

What is claimed is:
1. A microwave test set for evaluating an on mount waveguide run of a radar comprising:
  means for receiving a test signal from the radar;
  attenuating means for adjusting the strength of the test signal;
  power measuring means for measuring the strength of the test signal before it is applied to the waveguide run;
  means for applying the test signal to the waveguide run;
  receiver means connected at the end of the waveguide run;
  a data convertor receiver connected to the receiver means; and
  a true RMS meter connected to the data convertor receiver.
2. The microwave test set of claim 1 wherein the test signal is produced by the STAMO of the radar.
3. The microwave test set of claim 1 wherein the attenuating means consists of three series connected 50 db attenuators.

4. The microwave test set of claim 3 wherein the means for applying the test signal to the waveguide run consists of three C band hybrid T assemblies.

5. The microwave test set of claim 4 wherein the means for applying the test signal to the waveguide run further consists of a feed horn connected between the hybrid T assembly and the waveguide run.

6. The micowave test set of claim 1 wherein the means for applying the test signal to the waveguide run includes means for produding four equal-amplitude, in-phase signals and for injecting said signals into the four quadrant cluster of the radar antenna.

* * * * *